(12) United States Patent
Miniutti et al.

(10) Patent No.: US 7,004,583 B2
(45) Date of Patent: Feb. 28, 2006

(54) EYEWEAR LENSES AND METHODS OF MANUFACTURING

(75) Inventors: Robert Miniutti, Jamestown, RI (US); Harold Mukamal, Cranston, RI (US)

(73) Assignee: East Bay Technologies, Jamestown, RI (US)

( * ) Notice: Subject to any disclaimer, the term of this patent is extended or adjusted under 35 U.S.C. 154(b) by 0 days.

(21) Appl. No.: 10/353,062

(22) Filed: Jan. 29, 2003

(65) Prior Publication Data

US 2004/0145700 A1 Jul. 29, 2004

(51) Int. Cl.
*G02C 7/02* (2006.01)

(52) U.S. Cl. ..................... 351/159; 351/177
(58) Field of Classification Search ............... 351/159, 351/160 R, 162–3, 160 H, 165–6, 172, 163, 351/166
See application file for complete search history.

(56) References Cited

U.S. PATENT DOCUMENTS

| | | | |
|---|---|---|---|
| 2,938,232 A | 5/1960 | Martin | 425/562 |
| 3,850,502 A | 11/1974 | Bloom | 359/352 |
| 3,940,304 A | 2/1976 | Schuler | 156/245 |
| 4,008,031 A | 2/1977 | Weber | 425/567 |
| 4,091,057 A | 5/1978 | Weber | 264/2.2 |
| 4,130,672 A | 12/1978 | Onoki et al. | 427/164 |
| 4,211,823 A | 7/1980 | Suzuki et al. | 428/412 |
| 4,290,794 A | 9/1981 | Wedding | 65/30.11 |
| 4,310,225 A | 1/1982 | Davis | 351/176 |
| 4,364,878 A | 12/1982 | Laliberte et al. | 264/2.2 |
| 4,442,061 A | 4/1984 | Matsuda et al. | 264/328.7 |
| 4,498,919 A | 2/1985 | Mann | 65/30.11 |
| 4,519,763 A | 5/1985 | Matsuda et al. | 425/192 R |
| 4,624,971 A | 11/1986 | van Tao et al. | 522/37 |
| 4,679,918 A * | 7/1987 | Ace | 351/163 |
| 4,693,910 A | 9/1987 | Nakajima et al. | 427/168 |
| 4,800,122 A | 1/1989 | Sallavanti et al. | 428/412 |
| 4,935,166 A | 6/1990 | Lee et al. | 252/582 |
| 4,977,029 A | 12/1990 | Brown et al. | 428/429 |
| 5,047,447 A | 9/1991 | Gallas | 523/106 |
| 5,112,883 A | 5/1992 | Gallas | 523/106 |
| 5,147,585 A | 9/1992 | Blum | 264/1.38 |
| 5,181,141 A | 1/1993 | Sato et al. | 359/580 |
| 5,211,885 A | 5/1993 | Zepp | 252/587 |
| 5,351,100 A * | 9/1994 | Schwenzfeier et al. | 351/164 |
| 5,434,197 A | 7/1995 | Cohen | 523/135 |
| 5,702,819 A | 12/1997 | Gupta et al. | 428/412 |
| 5,734,457 A * | 3/1998 | Mitsui et al. | 349/106 |
| 5,751,481 A * | 5/1998 | Dalzell et al. | 359/485 |
| 5,793,465 A | 8/1998 | Gupta et al. | 351/161 |
| 5,840,926 A | 11/1998 | Hughes | 549/384 |
| 5,847,168 A | 12/1998 | Hughes | 549/384 |
| 5,861,934 A | 1/1999 | Blum et al. | 351/169 |
| 5,872,165 A | 2/1999 | Oberg et al. | 524/100 |
| 5,933,273 A | 8/1999 | Ferrante et al. | 359/359 |
| 6,004,723 A | 12/1999 | Figov | 430/272.1 |

(Continued)

OTHER PUBLICATIONS

Schneider Brochure "The Schneider individual RX concept", Schneider Optikmachines Software and Systems, Steffenberg, Germany.

*Primary Examiner*—Jordan M. Schwartz
*Assistant Examiner*—Jessica Stultz
(74) *Attorney, Agent, or Firm*—Steptoe & Johnson LLP

(57) ABSTRACT

Unfinished lenses, semi-finished lens including optical coatings or a transmission altering layer and methods of manufacturing are described. The unfinished lens includes an optical coating and a surface configured to receive a curve. Non-prescriptive and prescriptive lenses can be made by the method.

58 Claims, 4 Drawing Sheets

U.S. PATENT DOCUMENTS

| | | | |
|---|---|---|---|
| 6,089,710 A | 7/2000 | Zeidler | 351/159 |
| 6,113,811 A | 9/2000 | Kausch et al. | 252/585 |
| 6,113,812 A | 9/2000 | Hughes | 252/586 |
| 6,174,394 B1 | 1/2001 | Gvon et al. | 156/100 |
| 6,180,033 B1 | 1/2001 | Greshes | 264/1.32 |
| 6,231,183 B1 * | 5/2001 | Dillon | 351/163 |
| 6,335,051 B1 | 1/2002 | Kausch et al. | 427/163.1 |
| 6,362,271 B1 | 3/2002 | Lin et al. | 524/520 |
| 6,455,142 B1 | 9/2002 | Heberger et al. | 428/215 |
| 6,478,988 B1 | 11/2002 | Hughes et al. | 252/586 |
| 6,495,624 B1 | 12/2002 | Brown | 524/462 |
| 6,497,964 B1 | 12/2002 | Matsumura et al. | 428/447 |
| 6,500,486 B1 | 12/2002 | Anderson et al. | 427/164 |
| 6,506,446 B1 | 1/2003 | Yamamoto et al. | 427/165 |
| 6,817,712 B1 | 11/2004 | Hayashi | 351/166 |
| 6,888,590 B1 * | 5/2005 | Nishioka et al. | 349/57 |
| 2001/0005278 A1 | 6/2001 | Onomichi | 359/350 |
| 2002/0036359 A1 * | 3/2002 | Yamamoto et al. | 264/1.34 |
| 2002/0140899 A1 * | 10/2002 | Blum et al. | 351/159 |
| 2003/0008149 A1 * | 1/2003 | Moravec et al. | 428/412 |
| 2003/0090622 A1 | 5/2003 | Takeuchi | 351/159 |

* cited by examiner

EYEWEAR LENSES AND METHODS OF MANUFACTURING

TECHNICAL FIELD

This invention relates to eyewear lenses and methods of manufacturing the lenses.

BACKGROUND

Eyewear lenses are used in sunglasses, safety glasses, and corrective glasses. Vision correction for myopia (nearsightedness) and hypermetropia (farsightedness) can be accomplished using ophthalmic lenses having appropriate spherical curves on the anterior (outer) and posterior (inner) surfaces. When multi-focal lenses, progressive lenses, or adaptive lenses are used, both myopia and hypermetropia can be corrected. Astigmatism, with or without either of these errors, can be corrected if one of the surfaces is toroidal, or spherocylindrical, having different refractive powers or magnifications along two principal axes or meridians typically separated by 90 degrees. Corrective ophthalmic lenses can utilize optical coatings on the surfaces of the lenses to further enhance performance of the ophthalmic lenses. Non-prescriptive lenses have no power correction. However, eyeglass frame design can create a need for base curve requirements and prism imbalance correction to be introduced in the lenses depending on the angle (i.e., parascopic tilt, vertical and/or horizontal) relative to the eye. Fabrication of these lenses can be time consuming and expensive.

SUMMARY

In general, an unfinished lens, semi-finished lens or finished lens can include an optical coating or a transmission altering layer.

In one aspect, a method of manufacturing an eyewear lens includes forming a primary curve on a first surface of an optical material including a transmission altering layer. The curve can be formed by a method including grinding the surface. The method can include coating the primary curve with an optical coating, such as a photochromic, polarizing, anti-reflection, anti-scratch coating or a combination thereof, on the first surface of the optical material. The method can also include forming a complementary curve on a second surface of the optical material opposite the first surface. The coating can be introduced after the primary curve and the complementary curve are formed, for example, by dip coating, slot/extrusion coating, roll coating, spin coating, curtain coating, air-knife coating, hot-melt coating or a combination thereof. The primary curve and the complementary curve can be selected to form a prescriptive lens or a non-prescriptive lens. The primary curve is the first curve applied to the unfinished blank. The primary curve can be selected, for example, from a group eight or fewer curves.

In another aspect, a method of manufacturing a lens includes selecting a semi-finished unfinished lens including an optical material having a first surface having a primary curve and an optical coating and a second surface substantially opposite the first surface, the second surface configured to receive a complementary curve and including a transmission altering layer between the first surface and the second surface, and forming the complementary curve on the second surface. The primary curve and the complementary curve can be selected to form a prescriptive lens or a non-prescriptive lens. Forming the complementary curve can include grinding the surface. The primary curve can be an anterior primary curve or a posterior primary curve. As part of the method, the complementary curve can be selected from a group of curves that form an ophthalmic prescription in combination with the optical material and the primary curve or the complementary curve can be selected from a group of curves that form a non-prescriptive lens when combined with the optical material and the primary curve.

In another aspect, a semi-finished lens includes a base composed of an optical material of known refractive index. The semi-finished lens includes a first surface having a primary curve, a second surface substantially opposite the first surface and configured to receive a second curve, a transmission altering layer disposed between the first surface and the second surface, and a thickness between the first surface and the second surface capable of separating the primary curve and the second curve. The second surface can be configured to receive a complementary curve, such as a spherical, spherocylindrical, aspherical, progressive or toroidal curve.

In another aspect, an unfinished lens includes a base composed of an optical material of known refractive index. The unfinished lens includes a first surface configured to receive an anterior curve, a second surface configured to receive a posterior curve, and a transmission altering layer disposed between the first surface and the second surface.

In another aspect, a series of unfinished lenses includes a plurality of bases. Each base is composed of an optical material of known refractive index and includes a first surface configured to receive an anterior curve, a second surface configured to receive a posterior curve, and a transmission altering layer disposed between the first surface and the second surface. The series includes at least two bases having distinct different transmission altering layers.

In another aspect, a semi-finished ophthalmic lens includes a first surface having a primary curve and including an optical coating, a second surface substantially opposite the first surface, the second surface capable of receiving a complementary curve, and a transmission altering layer disposed between the first surface and the second surface.

In another aspect, a finished lens includes a first surface having a primary curve, a second surface having a second curve, and a transmission altering layer disposed between the first surface and the second surface. The first surface can include an optical coating. The transmission altering layer can include a dichroic material, or two dichroic layers and the lens includes a photochromic material.

In general, the primary curve can be selected from a group consisting of eight or fewer curves. The transmission altering layer can include a polarizer, a color, or a photochromic material. A surface of the lens can include an optical coating, such as an anti-scratch coating, a photochromic coating, a polarizing coating, an anti-fog coating, a tintable coating or an anti-reflective coating.

Unfinished lenses, or lens blanks, including unfinished lenses having a transmission altering layer, can be used to simplify fabrication of relatively expensive prescription or non-prescription lenses, for example, lenses with coatings. Improving the speed of delivery of prescription lenses can reduce wait times for a patient to receive the finished lenses and can eliminate the need to make a second trip to the optician, optometrist or ophthalmologist's office. Fabrication of finished lenses from unfinished lenses with a coating or a transmission altering layer or semi-finished lenses with a coating or transmission altering layer can reduce the cost of prescription lenses by eliminating intermediate sources such as a laboratory or a lens factory.

By stocking an unfinished or semi-finished lens that is subsequently processed to form a finished lens, a wide variety of specialized lenses having various polarization, photochromic, or color properties can be fabricated to any prescription. In addition to the numerous inventory reduction advantages, there are significant cost reductions. An unfinished lens can be produced inexpensively since no regard for optical surface quality is required. In addition, one or more coatings can be applied to a surface of the lens after forming a semi-finished lens or a finished lens at the processing site.

Details are set forth in the accompanying drawings and the description below. Other features, objects, and advantages will be apparent from the description and drawings, and from the claims.

DETAILED DESCRIPTION

A lens blank includes a base and a surface on the base having an optical coating. A second surface of the blank is opposite the coated surface and is configured to receive a complementary curve. Each lens blank can be finished into an ophthalmic lens. The lens blank can be made of an optical material of a known refractive index, such as an organic polymer or an inorganic material. The optical coating can be an anti-scratch coating, a weather-resistant coating, an ultraviolet protection coating, a photochromic coating, an anti-reflective coating, an anti-fog coating, a tintable coating, a polarizing coating, or a combination thereof.

A lens blank is an unfinished lens or semi-finished lens that is processed by one or more lens fabrication techniques including, for example, molding, grinding, carving, thermoforming, laminating, surface casting, fining and polishing, or combinations thereof, to form another semi-finished lens, which can be coated or uncoated, or a finished lens. In the process, at least one surface of the lens becomes an optical surface.

An unfinished lens is a piece of material having a known refractive index and has two non-optical surfaces configured to receive a primary curve and a complementary curve. A semi-finished lens is a piece of material having a known refractive index and has one non-optical surface configured to receive a primary curve or a complementary curve and an optical surface on the opposing surface. The optical surface can be a primary curve or a complementary curve and can be on the front surface or the back surface of the lens. A finished lens is a piece of material having a known refractive index and has two optical surfaces having a primary curve and a complementary curve separated by a thickness of material that affords the proper optical prescription, or a non-prescriptive lens. An optical surface is a shaped surface that has selected optical properties.

Figure 1A:
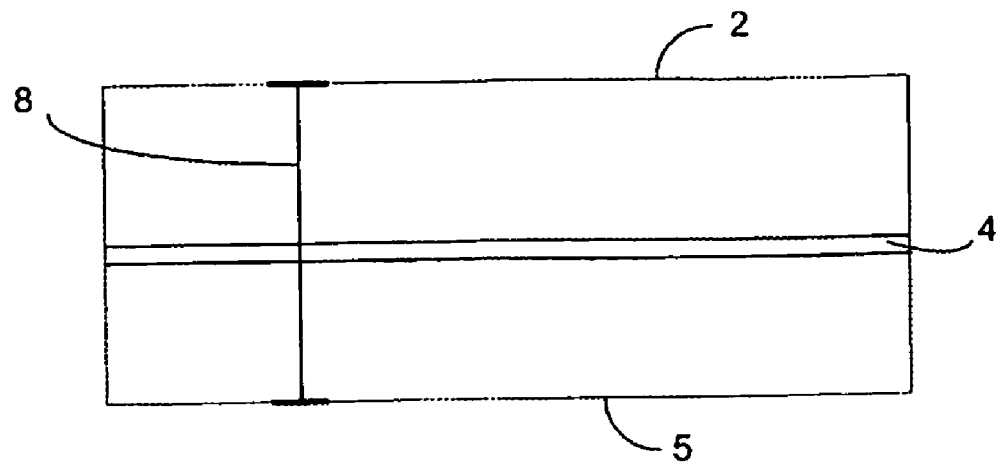
FIG. 1A is a schematic diagram depicting a cross-sectional view of an unfinished lens having a transmission altering layer.

Referring to FIG. 1A, an unfinished lens 1 includes an anterior surface 2, a transmission altering layer 4, and a posterior surface 5. The transmission altering layer 4 is positioned so that the layer is substantially unchanged when an optical surface is placed on the anterior surface and the posterior surface. The anterior surface 2 and posterior surface 5 are configured to receive a curve. A thickness 8 separates the surfaces by an amount sufficient to allow curves to be formed on the surfaces, by, for example, molding, grinding, carving, thermoforming, laminating, surface casting, or combinations thereof. The curve can be spherical, aspherical, progressive, or toroidal.

Figure 1B:
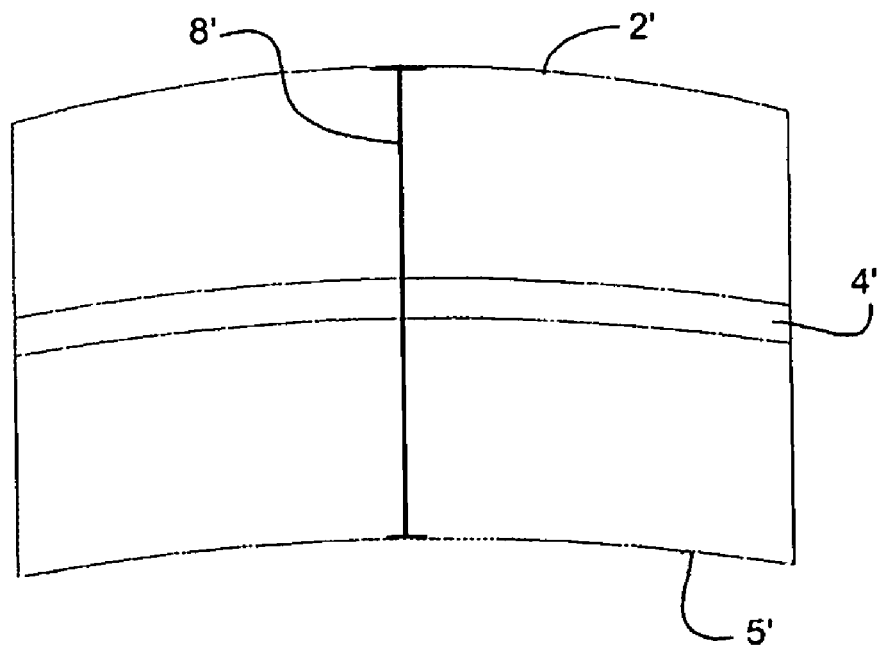
FIG. 1B is a schematic diagram depicting a cross-sectional view of an unfinished lens having a transmission altering layer.

Referring to FIG. 1B, an unfinished lens 1' includes an anterior surface 2', a transmission altering layer 4', and a posterior surface 5'. The transmission altering layer 4' is positioned so that the layer is substantially unchanged when an optical surface is placed on the anterior surface and the posterior surface. The anterior surface 2' and posterior surface 5' are configured to receive a curve. A thickness 8' separates the surfaces by an amount sufficient to allow curves to be formed on the surfaces, by, for example, molding, grinding, carving, thermoforming, laminating, surface casting, or combinations thereof. The curve can be spherical, aspherical, progressive, or toroidal. Unfinished lens 1' has a curved form in which anterior surface 2', transmission altering layer 4', and posterior surface 5' are shaped in the same direction, which can allow the unfinished lens make a finished lens of higher prescriptive power. The curved form can be introduced, for example, by thermoforming the flat unfinished lens of FIG. 1A.

Figure 2A:
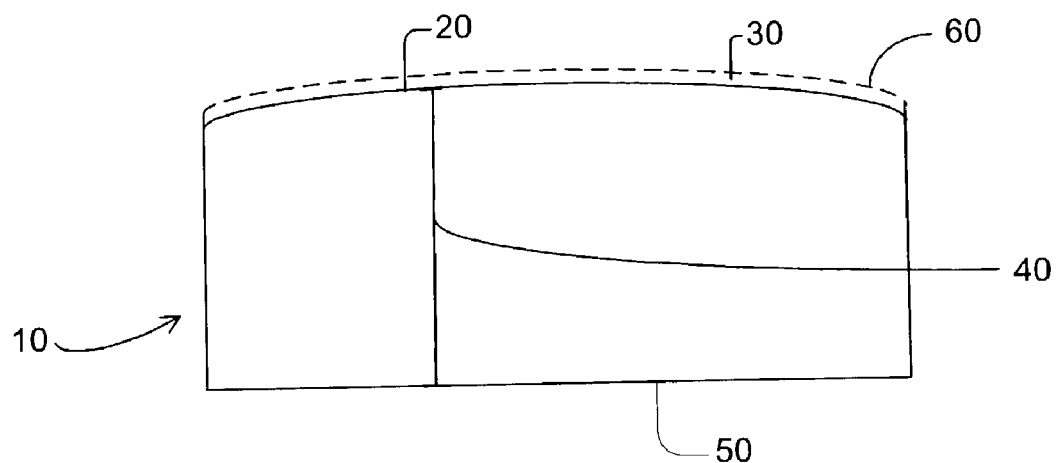
FIG. 2A is a schematic diagram depicting a cross-sectional view of a semi-finished lens having a coating on a surface.

Referring to FIG. 2A, a semi-finished lens 10 includes an anterior surface 20 characterized by a primary curve 60, an optical coating 30 and a posterior surface 50. The anterior surface 20 and posterior surface 50 are separated by a thickness 40. The anterior primary curve can be a convex curve selected from a set of base curves (e.g., eight or fewer, preferably seven or fewer, and more preferably six or fewer). The posterior surface 50 can be configured to receive a posterior curve. The posterior surface has dimensions adequate to receive the posterior curve. Specifically, the thickness of the blank between the anterior surface and the posterior surface is sufficient to allow the posterior curve to introduced into the posterior surface by, for example, grinding or carving the surface.

Figure 3A:
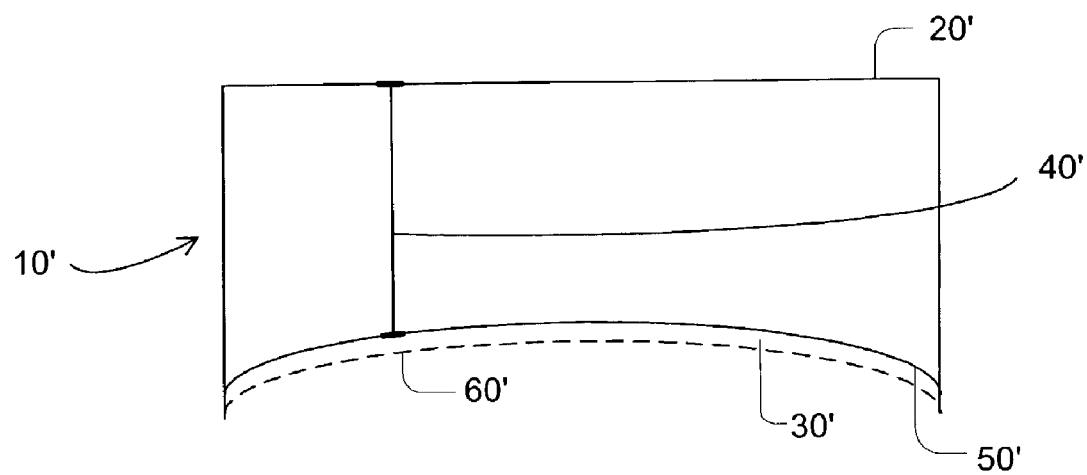
FIG. 3A is a schematic diagram depicting a cross-sectional view of a semi-finished lens having coating on a surface.

Referring to FIG. 3A, a semi-finished lens 10' includes an anterior surface 20', an optical coating 30' and a posterior surface 50' characterized by a primary curve 60'. The anterior surface 20' and posterior surface 50' are separated by a thickness 40'. The anterior primary curve can be a convex curve selected from a set of base curves (e.g., eight or fewer, preferably seven or fewer, and more preferably six or fewer). The anterior surface 20' can be configured to receive an anterior curve. The anterior surface has dimensions adequate to receive the anterior curve. Specifically, the thickness of the blank between the anterior surface and the posterior surface is sufficient to allow the anterior curve to introduced into the anterior surface by, for example, grinding or carving the surface.

Figure 2B:
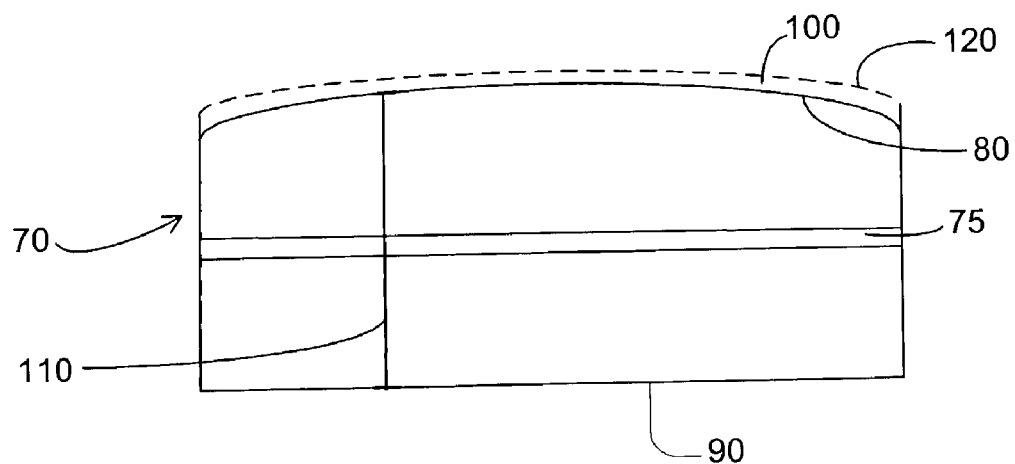
FIG. 2B is a schematic diagram depicting a cross-sectional view of a semi-finished lens having a coating on a surface and a transmission altering layer.

Referring to FIG 2B, a semi-finished lens 70 includes an anterior surface 80 characterized by a primary curve 120, a posterior surface 90, a transmission altering layer 75 between the anterior surface 80 and the posterior surface 90, and an optical coating 100 on the anterior surface 80. The anterior surface 80 and posterior surface 90 are separated by a thickness 110. The primary curve of the anterior surface can be a convex surface selected from a set of base curves (e.g., eight or fewer, preferably seven or fewer, and more preferably six or fewer). The posterior surface can be configured to receive a posterior curve. The thickness 110 is adequate to receive the posterior curve across the area of the posterior surface. The transmission altering layer 75 is positioned so that the layer is substantially unchanged when an optical surface is placed on the posterior surface.

Figure 3B:
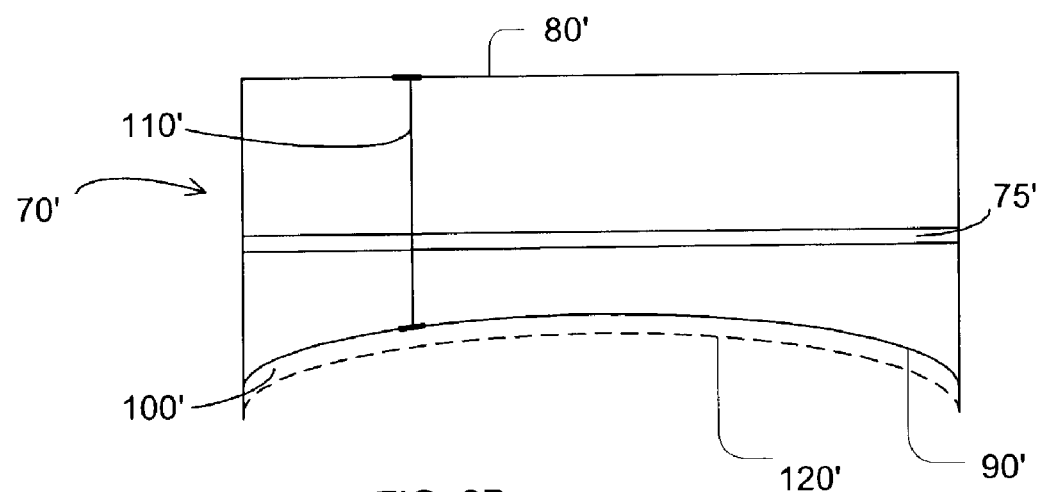
FIG. 3B is a schematic diagram depicting a cross-sectional view of a semi-finished lens having a coating on a surface and a transmission altering layer.

Referring to FIG. 3B, a semi-finished lens 70' includes an anterior surface 80', a posterior surface 90' characterized by a primary curve 120', a transmission altering layer 75' between the anterior surface 80' and the posterior surface 90', and an optical coating 100' on the posterior surface 90'. The anterior surface 80' and posterior surface 90' are separated by a thickness 110'. The primary curve of the posterior surface can be a concave surface selected from a set of base curves (e.g., eight or fewer, preferably seven or fewer, and more preferably six or fewer). The anterior surface can be configured to receive an posterior curve. The thickness 110' is adequate to receive the anterior curve across the area of the anterior surface. The transmission altering layer 75' is positioned so that the layer is substantially unchanged when an optical surface is placed on the anterior surface.

Figure 4A:
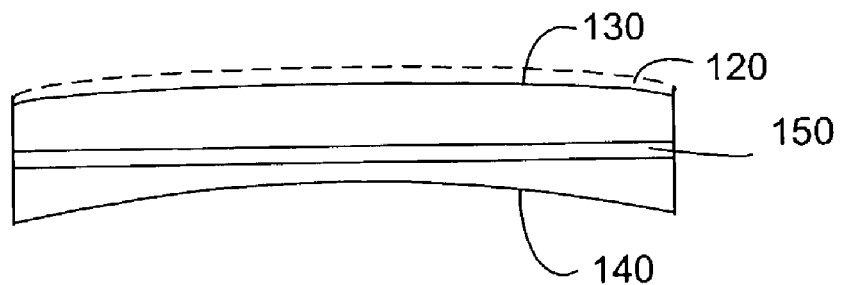
FIG. 4A is a schematic diagram depicting a cross-sectional view of a finished lens having a transmission altering layer and a coating on a surface.

Referring to FIG. 4A, a finished lens includes a first surface 130 which includes a primary curve and includes a coating 120 on the first surface. The lens includes a second surface 140, which is substantially opposite the first surface 130. A transmission altering layer 150 is positioned between the first surface 130 and the second surface 140. The first surface and the second surface have optical surfaces that form a primary curve and a complementary curve separated by a thickness of material that affords the proper optical prescription.

Figure 4B:
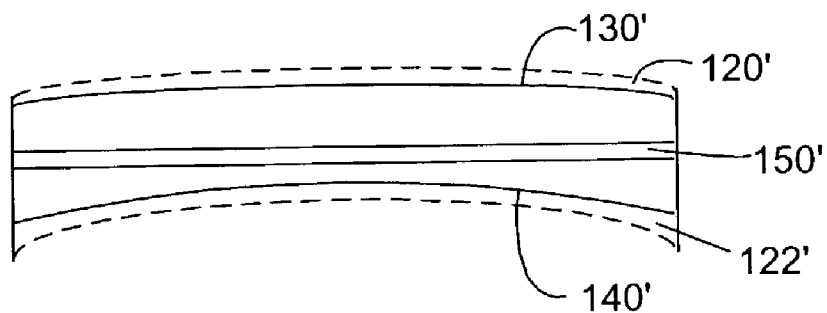
FIG. 4B is a schematic diagram depicting a cross-sectional view of a finished lens having a transmission altering layer, a coating on a first surface, and a coating on a second surface.

Referring to FIG. 4B, a finished lens includes a first surface 130' which includes a primary curve and includes a coating 120' on the first surface. The lens includes a second surface 140', which is substantially opposite the first surface 130'. A coating 122' can be on the second surface. A transmission altering layer 150' is positioned between the first surface 130' and the second surface 140'. The first surface and the second surface have optical surfaces that form a primary curve and a complementary curve separated by a thickness of material that affords the proper optical prescription.

Figure 5:
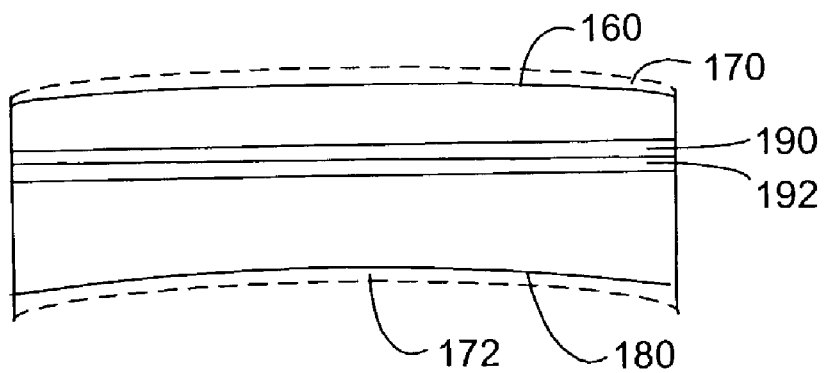
FIG. 5 is a schematic diagram depicting a cross-sectional view of a finished lens having a first transmission altering layer, a second transmission altering layer, and a coating on a surface.

Referring to FIG. 5, a finished lens includes a first surface 160 which includes a primary curve and includes a coating 170 on the first surface. The lens includes a second surface 180, which is substantially opposite the first surface 160. A coating 172 can be on the second surface. A first transmission altering layer 190 is positioned between the first surface 160 and the second surface 180. A second transmission altering layer 192 can also be positioned between the first surface 160 and the second surface 180. The first surface and the second surface have optical surfaces that form a primary curve and a complementary curve separated by a thickness of material that affords the proper optical prescription.

The transmission altering layer is a film, coating, or laminated layer of material between the surfaces that changes the properties of light transmitted through the material, such as polarization or spectral properties. The transmission altering layer can include a plurality of layers, each layer changing different properties of light transmitted through the material. For example, transmission altering layer can be a polarizer layer, a photochromic layer, an infra-red absorbing layer, a laser protective layer, a melanin-containing layer, a dichroic layer or colored layer. The layer can be introduced by molding a disc-shaped structure, extruding layers to form a sheet which is cut to form a disc-shaped structure, or laminating layers to form a sheet which is cut to form a disc-shaped structure. The transmission altering layer is positioned so that the layer is substantially unchanged when an optical surface is placed on the anterior surface and the posterior surface.

A series of unfinished lenses includes at least one transmission altering layer. A series of semi-finished lenses can include a plurality of lenses, each of which has a primary curve selected from a group of eight or fewer curves, and can optionally include a transmission altering layer. From the series, a wide range of prescriptions can be prepared.

Design of ophthalmic lenses can provide optimal correction with a limited number of anterior and posterior primary curves have been described, for example, in U.S. Pat. Nos. 4,310,225 and 6,089,710, each of which is incorporated herein by reference in its entirety. The anterior and posterior curves are selected to produce a lens having a desired prescription. When one curve is a primary curve, the other curve is complementary to it to create a lens having a desired prescription. In certain embodiments, the desired prescription can be a neutral prescription, in which case the resulting lens is a non-prescriptive lens having the transmission altering layer and the coating, such as a lens for non-prescriptive eyewear, such as sunglasses or safety glasses.

The lens can be a single vision lens, an aspheric lens, or a progressive lens. Generally, in a progressive power multifocal lens, there are a zone designated as a far (or distance) vision viewing portion for viewing long-distance places, another zone designated as an intermediate vision viewing portion for viewing middle-distance places and still another zone designated as a near vision viewing portion for viewing short-distance places. Middle-distance is a distance ranging from 50 centimeters (cm) to 2 meters (m) approximately. Long-distance is a distance longer than the middle-distance. Short-distance is a distance shorter than the middle-distance, such as a distance ranging from 30 cm to 33 cm.

The lens can be formed of an optical material that can have a high refractive index which allows for production of thinner lenses when designing lenses of the same power and design. Reduction of edge thickness of the lens offers practical advantages in terms of weight savings and aesthetic reasons. The optical material in the unfinished lens can include an organic material, such as an organic polymer, for example, a polycarbonate, a polystyrene, an acrylic polymer, cellulose acetate, an acrylic copolymer, a polythiourethane, a polymethyl methacrylate, or a polysulfone, or an inorganic material, such as a silica-based glass. The polycarbonate can have a refractive index of 1.586. A suitable polycarbonate is commercially available under the trademark LEXAN from G.E. Plastics (Pittsfield, Mass.) and MAKROLON from Bayer Polymers (Pittsburgh, Pa.).

The semi-finished or finished lenses can be prepared by lens manufacturing techniques. Lens fabrication techniques can include, for example, molding, grinding, thermoforming, laminating, surface casting, or combinations thereof. Molding can include injection molding, with or without compression. Injection molding without any compression can include use of a mold cavity having fixed surfaces throughout the molding cycle. Injection molding with compression can be employed to manufacture an unfinished lens. There are two types of injection/compression molding techniques, clamp-end injection/compression and auxiliary component injection/compression. In clamp-end injection/compression includes compression that can be induced by movable platen motion, or molding machine clamp-end compression. Examples of these processes have been described in, for example, U.S. Pat. Nos. 2,938,232, 4,442,061 and 4,519,763 and Engle brochure A-24-TV-4/75, Ludwig Engel, Canada Ltd., Guelph, Ontario, each is incorporated by reference in its entirety.

Auxiliary component injection/compression includes the use of auxiliary springs, cylinders or the like which function to apply a compressive force to opposing optical surfaces and which are commonly internal to a mold itself or as peripheral apparatus thereto. The primary difference between auxiliary component molding and clamp-end injection/compression is that mold compression is provided by a stroke-producing element inherent to known modern injection molding machines whereas mold compression is provided by auxiliary springs or hydraulic cylinders, for example, in the former. Examples of auxiliary component injection/compression are described in U.S. Pat. Nos. 4,008,031, 4,364,878, and 4,091,057, each of which is incorporated by reference in its entirety. An auxiliary component process is described by Laliberte in U.S. Pat. No. 4,364,878 which is incorporated by reference in its entirety.

Grinding by mechanical means can be another method to produce the unfinished lens. Casting is another method to fabricate the unfinished lens may be carried out as disclosed in U.S. Pat. Nos. 5,702,819, and 5,793,465, each of which is incorporated herein by reference in its entirety. Alternatively, grinding can be accomplished using commercially available grinding technology, Schneider I-RX concept, HSC 100/CCP 101 from Schneider Opticmachines Software and Systems (Steffenberg, Germany). The finished lens can be a monofocal, bifocal, trifocal, multifocal, spheric, aspheric, progressive, or any other corrective lens.

The semi-finished lens or finished lens can be coated with an optical coating on the anterior or posterior surface. Suitable optical coatings include, for example, an anti-scratch coating, a weather-resistant coating, an ultraviolet protection coating, a photochromic coating, a polarizing coating, an anti-fog coating, a tintable coating or an anti-reflective coating. The anti-scratch coating can be applied to the first and second surfaces of the unfinished lens whereas the other coatings can be applied to the anterior surface of the lens. Several coatings can be applied to the semi-finished or finished lens, followed by a final coat of the anti-scratch coating.

A uniform coating can be applied to a surface of the lens by a variety of methods, including, for example, dip coating, slot/extrusion coating, roll coating, curtain coating, air-knife coating, spin coating, hot-melt coating or any other coating method. In dip coating, for example, the lens is dipped into a bath of the coating material, which is normally of a low viscosity to enable the coating to run back into the bath as the lens emerges. In slot/extrusion coating, for example, the coating material is squeezed out by gravity or under pressure through a slot and onto the lens. If the coating material is 100% solids, the process is termed extrusion coating and in this case, the line speed can be frequently much faster than the speed of the extrusion. This enables coatings to be considerably thinner than the width of the slot. In roll coating process, for example, an engraved roller can run in a coating bath, which fills the engraved dots or lines of the roller with the coating material. A blade can remove the excess coating on the roller. The coating material can then deposited onto the lens as it passes between the engraved roller and a pressure roller. Another type of coating technique includes curtain coating process. In curtain coating, for example, a bath with a slot in the base allows a continuous curtain of the coating to fall into a gap between two conveyors. The lens can be passed along the conveyor at a controlled speed and so receives the coating on its upper face. Alternatively, in air knife coating, for example, the coating material is applied to the lens surface and the excess material is blown off the surface by a powerful jet from the air knife. In a spin coating process, a coating material is deposited on the lens surface, and the lens is rotated rapidly (for example, at 500 to 4000 rpm) to form the coating. In this method, the coating thickness can be controlled by the rotation rate. In most of the coatings techniques applied commercially, the low viscosity required to achieve an even coating by solution or dispersion. In a small number of applications, the desired coating can be melted and applied while hot in a hot-melt coating processes.

Photochromic coatings are coatings that change color when exposed to sunlight. Typically, photochromic coatings change color reversibly. When exposed to electromagnetic radiation containing ultraviolet rays, such as the ultraviolet radiation in sunlight or the light of a mercury lamp, the photochromic coating exhibits a reversible change in color. When the ultraviolet radiation is discontinued, the photochromic coating can return to its original color or colorless state. The amount of photochromic coating applied to or incorporated onto a surface of the ophthalmic lens is not critical provided that a sufficient amount is used to produce a photochromic effect discernible to the naked eye upon activation. Generally such amount can be described as a photochromic amount. The particular amount used depends often upon the intensity of color desired upon irradiation thereof and upon the method used to incorporate or apply the photochromic substances. Typically, the more photochromic substance applied or incorporated, the greater is the color intensity up to a certain limit. Suitable examples of photochromic coatings can include pyrans, substituted and unsubstituted benzopyrans and, substituted and unsubstituted naphthopyrans containing coatings. Examples of photochromic coatings are described in U.S. Pat. Nos. 6,113,812, 5,847,168, 5,840,926, and 6,478,988, each of which is incorporated by reference in its entirety.

The photochromic substances can be applied to or incorporated into the optical material used to produce the lens by dissolving or dispersing the photochromic substance into the monomer of the optical material. For example, the photochromic substance can be added to the monomer of the optical material prior to polymerization. For example, the photochromic substance can be imbibed into the lens by immersing the lens in a hot solution of the photochromic substance. Alternatively, the photochromic material can be thermally transferred on the surface of the lens. The photochromic substance can be applied as a separate layer between adjacent layers of the lens, e.g., as a part of a polymeric film. The photochromic substance can be applied as part of a coating or film placed on a surface of the finished or semi-finished lens.

A polarizing coating polarizes light that passes through the lens. One of the most commonly used type of polarizer can be a dichroic polarizer, which absorbs light of one polarization and transmits light of the other polarization. Incorporating a dye into a polymer matrix stretched in at least one direction makes one type of dichroic polarizer. Dichroic polarizers can be prepared by uniaxially stretching a polymer matrix and applying a dichroic dye to the polymer matrix. Alternatively, a polymer matrix can be stained with an oriented dichroic dye. Dichroic dyes include anthraquinone and azo dyes, as well as iodine. Many commercial dichroic polarizers use polyvinyl alcohol as the polymer matrix for the dye.

The polarizing coating can be prepared using dichroic polarizers which can include a thin film of molecularly oriented dye compounds applied to a surface of lens. The coating can be a dye-based polarizing coating, for example, a dichroic polarizing film. In polarizing coatings, dye molecules aggregate into particles oriented in a predetermined direction on a surface of a substrate to enable the dye to polarize light transmitted through the dye. Another type of polarizer can be a reflective polarizer that reflects light of one polarization and transmits light of another orthogonal polarization. One type of reflective polarizer is made by forming a stack of alternating sets of polymer layers, one of the sets being birefringent to form reflective interfaces in the stack. Typically, the indices of refraction of the layers in the two sets are approximately equal in one direction so that light polarized in a plane parallel to that direction is transmitted. The indices of refraction are typically different in a second, orthogonal direction so that light polarized in a plane parallel to the orthogonal direction is reflected. Examples of polarizing films are described in U.S. Pat. Nos. 6,335,051, 6,113,811, and 6,174,394, each of which is incorporated by reference in its entirety.

The polarizing coating can be prepared by mixing polyvinyl alcohol, and optionally a second polymer in a ratio, between 5:1 and 100:1 by weight. The solution can include typically 1 to 50 wt. % solids, and preferably 5 to 25 wt. % solids. This dispersion/solution of the two polymers can then be applied to the surface of a substrate. The substrate may be a lens, another film, a multilayer stack, a plastic object, or any other surface that allows stretching of the polyvinyl alcohol film. Application of the dispersion/solution may be accomplished by a variety of methods, including, for example, coating the substrate using techniques, for example, dip coating, slot/extrusion coating, roll coating, curtain coating, air-knife coating, spin coating, hot-melt coating, or any other coating method capable of providing a uniform coating. Typically, the thickness of the coating can be 25 to 500 nanometers when wet and, for example, 50 to 125 nanometers. After coating, the polyvinyl alcohol film is dried at a temperature typically between 100° C. to 150° C. The film is then stretched to orient the film. The film can be removed from the substrate. The film may then be adhered to a lens. A finished polyvinyl alcohol film typically includes a dichroic dye material to form a dichroic polarizer. The dichroic dye material may include dyes, pigments, and the like. Suitable dye materials for use in the dichroic polarizer film include, for example, iodine, as well as anthraquinone or azo dyes, such as Congo dyes. Such layers or coatings may include, for example, slip agents, conductive layers, anti-static coatings or films, barrier layers, flame retardants, UV stabilizers, abrasion resistant materials, optical coatings, compensation films, retardation films, diffuse adhesives, and/or substrates designed to improve the mechanical integrity or strength of the film or device. In addition, an adhesive may be applied to the polyvinyl alcohol film to adhere the film to the lens. This may be particularly useful when the polyvinyl alcohol film is removed from a first substrate and then placed on a lens. Dichroic dyes used in polarizing film and methods of making them, are described in E. H. Land, *Colloid Chemistry* (1946). Still other dichroic dyes, and methods of making them, are discussed in the *Kirk Othmer Encyclopedia of Chemical Technology*, Vol. 8, pp. 652–661 (4th Ed. 1993), and in the references cited therein. The dichroic dye may be added to the dispersion or solution of the polyvinyl alcohol and second polymer prior to coating. Alternatively, a polyvinyl alcohol film may be stained with a staining composition, such as, for example, an iodine-containing solution. One example of a suitable staining composition is an iodine-containing solution. The iodine stained film may be stabilized using, for example, a boron-containing composition, such as a boric acid/borax solution. Other stains may require different stabilizers.

An anti-reflective coating reduces reflection of light from a surface of the lens. Reflection of light can cause glare. Glare can interfere with normal vision and can be a source of irritation of the eye, even to the extent of causing temporary blindness. The glare from the sun or, at night, approaching vehicle headlights, is a long recognized source of danger, impaired vision, fatigue and irritation to unprotected drivers. An anti-reflective coating on the ophthalmic lens can protect against glare. The anti-reflective coating can include a multi-layered film comprising plural transparent metal oxide layers superposed one on another. The transparent metal oxide layers reduce reflections of light in a wide wavelength region, and can are formed by chemical vapor deposition (CVD) process or physical vapor deposition (PVD) process (especially, vacuum deposition process). Transparent metal oxide layers can provide, for example, an anti-reflection coating having excellent optical characteristics. Examples of anti-reflection coatings are described in U.S. Pat. Nos. 5,181,141, 4,693,910 and 4,130,672, each of which is incorporated by reference in its entirety.

An anti-reflection film can be applied to a lens by, for example, vacuum-deposition. For example, a single film of $MgF_2$ can be vacuum-deposited as an anti-reflection film on the surface of a substrate. The surface of the lens is cleaned and heated up to temperatures of 150° C.–350° C. in vacuum to completely remove moisture and organic contamination on the surface. Alternatively, a durable anti-reflection film can be applied on the lens at lower than 120° C. degree by vacuum depositing a film of silicon oxide on the surface of the lens. Alternatively, a metal and metal oxide film can be vapor deposited on the lens. Such an anti-reflection film can be a single-layered anti-reflection film or a multi-layered anti-reflection film the latter being obtained by laminating a low refractive index film layer and a high refractive index film layer by turns.

A laser-protective layer includes a dye that absorbs laser light, for example, in the infrared region of the visible spectrum. The dye can be selected to absorb at the wavelength of interest. A solid-state filter can be formed by vapor depositing a dye in a polyester matrix in a vacuum system to randomly disperse dye molecules in a solid diluent. A suitable dye can be a porphyrin, a metallophthalocyanine, a rare-earth diphthalocyanine, a cyanine, a carbocyanine, a merocyanine or tetracene. Examples of laser-protective coatings are described in U.S. Pat. Nos. 5,211,885 and 4,935,166, each of which is incorporated by reference in its entirety.

An infrared absorbing layer controls transmission of infrared light through the lens. The layer can include an infrared absorber such as, for example, bis(4-substituted thiobenzil) metal compounds. The metal in the infrared absorber can be, for example, nickel. The layer can be formed by dissolving the near-infra red absorber in a solution or a monomer, and then apply the solution as a film-forming layer or polymerize the monomer to form the layer. Alternatively, the infrared absorbing layer can be composed of silicone (polysiloxane) or a mixture of silicones cross-linked by cross-linking agents deposited on the plate from a solution dissolved in an organic solvent. Examples of infra-red absorbing layers are described in U.S. Pat. Nos. 5,434,197 and 6,004,723, each of which is incorporated by reference in its entirety.

A melanin containing layer can be applied to a surface of a lens to absorb radiation and to provide protection from radiation. The melanin can be applied to the surface of the lens or may be incorporated into a matrix of an optical material. Melanin can include an eumelanin, a phaeomela-nin, an allomelanin or a catechol melanin. Melanin can be formed by oxidation of tyrosine followed by free-radical polymerization. The free-radical initiator can be benzoyl peroxide, di-tert-butyl peroxide and di(1-cyano-1-methyl ethyl) diazene (azobisisobutyronitrile). The choice of the free-radical initiator is determined by its solubility properties and the desired reaction kinetics. The typical solvent for preparing the melanin is water, however, organic solvents, for example, dimethyl sulfoxide (DMSO), chloroform, acetonitrile, toluene and 1,2-dichloroethane can also be used. The allomelanins can be formed by the free-radical polymerization of catechol. Examples of melanin containing layers are described in U.S. Pat. Nos. 5,112,883 and 5,047,447, each of which is incorporated by reference in its entirety.

A dichroic layer is a layer that transmits wavelengths longer than a threshold wavelength and reflect wavelengths shorter than the threshold wavelength. A dichroic layer produces its reflection properties through the phenomenon of interference. The dichroic layer consists of multiple (e.g., up to several dozen) thin layers, each only a quarter of a wavelength of the light thick, alternating between materials of a high and low refractive index. Fine tuning of the thicknesses of the layers and the way they are combined enable virtually any reflection curve to be created. The dichroic layer can be structured by stacking layers in such a manner that two or more peak reflections occur. When stacked dichroic layers are combined with a photochromic material in or coating on the lens, the color of reflected light from the surface of the lens can change depending on the color state of the photochromic material.

The dichroic layer can be formed from a polyvinyl alcohol film incorporating a dye material that can be a dichroic polarizer. Typically, the polyvinyl alcohol film is stretched to orient the film. The orientation of the polyvinyl alcohol film determines the optical properties (e.g., the axis of extinction) of the film. A second polymer can be added during the formation of the polyvinyl alcohol film to reduce cracking. Suitable second polymers include, for example, polyvinyl pyrrolidone and polyesters dispersible in the solvent of the polyvinyl alcohol. Examples of water-soluble or water dispersible polyesters include sulfonated polyesters. The polyvinyl alcohol film may be made by a variety of techniques. One exemplary method for making the film includes combining the polyvinyl alcohol and the second polymer in a solvent according to the above-mentioned ratios and weight percentages. This dispersion/solution of the two polymers can be applied to the surface of the lens. After coating, the polyvinyl alcohol film is dried and the film can be stretched using, for example, length orienters or tenter clips to orient the film. A finished polyvinyl alcohol film typically includes a dichroic dye material to form a dichroic coating. The dichroic dye can include dyes, and pigments. Suitable dye materials for use in the dichroic coating can include, for example, iodine, as well as anthraquinone and azo dyes, such as Congo dye. Examples of dichroic coatings are described in U.S. Pat. No. 6,335,051, which is incorporated by reference in its entirety.

An anti-scratch coating reduces the incidence of scratching a surface of the lens. Scratch-resistant coating can be applied to protect the lens against shocks, bruises and other mechanical accidents as well as against wear resulting from normal use. Such a coating can be useful to avoid damage to a lens when exposed to shock and wear leading to progressive damage. The coating material can be, for example, a polysiloxane based protective coating, the structure of which resembles to some extent that of cross-linked polysilicic acid, by the in situ polymerization of organo-silicon compounds which are previously partly hydrolyzed. During the hardening (curing) of such coatings, polymerization occurs, either due to the formation of Si—O—Si bridges (by the dehydration of silanol functions), or due to the participation of polymerizable organic groups belonging to substituents possibly present on the silicon atoms. The coating material can be UV curable, visible light curable, or other photo-polymerizable coating, which can be applied on a surface to produce thereon a translucent or transparent coating resisting corrosion and abrasion. Examples of anti-scratch coatings are described in U.S. Pat. Nos. 4,624,971 and 6,500,486, each of which is incorporated by reference in its entirety.

For example, the coating can be applied by vapor phase deposition of glass-like or silica-like materials evaporated under vacuum. Alternatively, a polymerizable composition can be applied on a lens for providing thereon, after polymerization, a translucent or transparent abrasion and weather and solvent resistant coating. The polymerizable composition can include an organic phase consisting of one or more photo-polymerizable monomers and/or prepolymers, one or more polymerization catalysts or initiators and a mineral charge or filler of finely divided silica or alumina carrying, grafted on the particles thereof, followed by UV or photo-polymerization of the monomers to form the anti-scratch coating. The method of anti-scratch coating has been described in U.S. Pat. No. 4,624,971, which is incorporated herein by reference in its entirety.

A weather-resistant coating improves the surface properties of the lens. Typically, the coating can prevent rain from wetting-out or collecting on the surface of the lens and degradation of the optical material upon exposure to sunlight. The coating can be applied by laminating an acrylic resin film on the surface of the lens. Alternatively, a reaction product of a hydroxyl group-containing benzophenone compound with a silane and/or a hydrolyzate thereof and a silane compound and/or a hydrolyzate thereof can be applied to the surface of the lens to form a coating having weather resistance. Alternatively, plasma polymerization of perfluo-robutene and other perfluroalkyl polymers onto the exterior surface of lens can be used to reduce the wetability and adhesion to the surface of the lens or a miscible blend of polymers including polyvinylidene fluoride and polymers including polyalkyl methacrylates within a certain molecular weight range can result in a coating composition with weather resistant properties, for example, hardness, gloss retention and solvent resistance. The polymers can include polyvinylidene fluoride which can be a homopolymer of vinylidene fluoride, that is PVDF, or a copolymer of more than about 80% vinylidene fluoride and up to about 20% hexafluoropropylene. The polyalkyl methacrylate may be the homopolymer of methyl methacrylate, PMMA, but can also be a copolymer comprising at least 65% methyl methacrylate and up to 35% other alkyl methacrylates such as ethyl methacrylate and butyl methacrylate. Examples of weather-resistant coatings are described in U.S. Pat. Nos. 6,497,964, 6,495,624 and 6,362,271, each of which is incorporated by reference in its entirety.

An ultraviolet (UV) protection coating can block or reflect UV light from a surface of the lens while concurrently reducing reflections of visible light from the surface of the lens. Exposure to UV light, such as the UV light present in sunlight, can cause a variety of problems. For example, UV light can cause the optical material to craze as a result of photoinduced chemical crosslinking. Thus, the optical material when exposed to UV light will generally develop a network of fine cracks as a result of the photoinduced chemical crosslinking. Moreover, exposure to UV light can lead, at least in part, to the formation of cataracts in the eye and cause cellular damage to the eye. In an attempt to reduce the deleterious effects of exposure to UV light, chemical UV absorbers, such as organic dyes can be used to reduce, but not eliminate UV-induced damage. Alternatively, the UV protection coating can be alternating layers of a first dielectric material and a second dielectric material stacked upon a surface of the lens surface. The first dielectric material has a higher index of refraction then the second dielectric material. In addition, each layer of the second dielectric material can have an optical thickness, which is greater than the optical thickness of the underlying layer of the first dielectric material upon which the layer of the second dielectric material is stacked. Alternatively, polymer bound ultraviolet light absorbers can be used including benzotriazoles, 2-hydroxybenzophenones oxanilide, and 2-hydroxyphenyltriazines. A polymer-bound benzotriazole or polymer-bound triazine can be incorporated into a coating in combination with at least one other ultraviolet light absorber to improve resistance of a coating composition to ultraviolet light degradation. The polymer-bound benzotriazole or polymer-bound triazine prevents migration of the benzotriazole or triazine from the surface coating and increases its chemical stability in a coating composition, thus providing longer lasting ultraviolet protection. The polymer-bound benzotriazole and polymer-bound triazine may be used in combination with each other, or either one may be used in combination with other ultraviolet absorbers such as non-polymeric benzotriazoles, non-polymeric triazines, 2-hydroxybenzophenone, oxanilide, and mixtures thereof. The benzotriazole and triazine can be added as separate polymers or can be polymerized onto a single polymeric compound. Examples of ultraviolet protection coatings are described in U.S. Pat. Nos. 5,933,273 and 5,872,165, each of which is incorporated by reference in its entirety.

An anti-fog coating improves hydrophilicity and moisture absorptivity on a surface of the lens, which imparts the surface with anti-moisture condensation property. The anti-fog coating can be produced, for example, by dissolving polyacrylic acid and polyvinyl alcohol in a solvent mixture of a lower alcohol, as an organic solvent, and water. Acetylacetone can be added and the solution applied to the surface of the lens. The coating can be dried to provide a uniform film layer. Alternatively, a polymeric binder and surfactant can be applied to the surface of the lens. One suitable binder can be a water-soluble copolyester. For example, the surfactant can be an anionic surfactant. The surfactant can contain less than about 0.5 weight percent of, for example, a fluorosurfactant. Examples of anti-fog coatings are described in U.S. Pat. Nos. 6,506,446 and 6,455,142, each of which is incorporated by reference in its entirety.

A tintable coating can provide a consumer with an option of selecting a lens that is custom tinted in a substantially infinite array of colors and styles. The tintable coating can be of a thickness of no more than 10 microns on a surface of the lens and impart a visible transmission of less than 50%, preferably less than 30%. Typically, melamine, alkyd, and polyester resins have been investigated with compatible dyes. The dye can be, for example, sulfonic acid species of the azo or anthraquinone dyes. Alternatively, a tintable coating can include an alkylsiloxane containing a dipolar silane, which can be an ester-functional silane, a hydroxy-functional silane, an amino-functional silane, a carboxylic acid-functional silane, or a halide form of the silane. Examples of tintable coatings are described in U.S. Pat. Nos. 4,977,029, 4,800,122, and 4,211,823, each of which is incorporated by reference in its entirety.

In one example, pucks (unfinished lens blanks) are created having approximately 5 diopters (0.50 diopter, 2 diopter, 4 diopter, 6 diopter, and 8 diopter) from a polycarbonate sheet incorporating a transmission altering layer (e.g., a polarized layer). The sheet was cut and formed to the required puck primary curves (e.g., diopters). The top and bottom surfaces were not optical in quality. In order to service the laboratory market, a front curve was generated using a Schneider HC100. In practice, this curve can be a simple sphere, a progressive, or an aspheric. The front surface was protected with a hard coating. The front surface can be enhanced with a photochromic coating, anti-reflective coating, anti-fog coating and/or tinted (i.e. gradient tint) coating. Alternatively, the front surface can be molded.

Other examples of a method of manufacturing eyewear include the following.

A sheet of polycarbonate including a polarizing layer and having unfinished surfaces is cut to size to form an unfinished lens. One surface is formed by grinding to create an optical surface having a primary curve of the required diopters. The optical surface is coated with a hard coating to form a semi-finished lens. The semi-finished lens is shipped to an optical laboratory. A complementary curve is applied by grinding to the opposite surface for form a second optical surface, which combined with the first optical surface forms a lens having a selected prescription. An abrasion-resistant coating is applied to the second surface.

In another example, a sheet of polycarbonate including a polarizing layer and having an optical surface is cut to size to form a semi-finished lens. The semi-finished lens is shipped to an optical laboratory. A complementary curve is applied by grinding to the opposite surface for form a second optical surface, which combined with the first optical surface forms a lens having a selected prescription. A photochromic coating is applied to one optical surface. An abrasion-resistant coating is applied to the both surfaces.

In another example, a polarizing coating is laminated to an optical surface of an unfinished lens. An abrasion-resistant coating is applied to the polarizing coating to form a semi-finished lens. The semi-finished lens is shipped to an optical laboratory. A complementary curve is applied by grinding to the back surface for form a second optical surface, which combined with the first optical surface forms a lens having a selected prescription. An abrasion-resistant coating is applied to the back surfaces.

Some coatings/films are better suited to being on the front surface of the lens rather than in the lens or imbedded in the interstitial layer. For example, anti-reflective coatings should be the outermost layer to function correctly. Also, UV dependent coatings, like photochromics, should be close to the outer surface, with the exception of having a protective-abrasive/UV protective layer over it. In these cases, coatings have been applied by via dip coating, spin coating over the front surface of the semi-finished lens or via vacuum coating in the case of an antireflective coating. Subsequent to coating, the rear surface of the semi-finished lens is ground to form the second optical surface which can be subsequently coated.

The resulting semi-finished lens suitable for backside grinding in a laboratory to produce a final prescription. By adding a film polarizer, coating or color layer within the unfinished lens, additional features are added. The net result is that lenses of hundreds of different colors, photochromics of many colors, polarized coatings of various intensities, and hard coatings can be offered at a lens source without carrying any significant prescription inventory.

Other embodiments are within the scope of the following claims.

What is claimed is:

1. A semi-finished lens comprising a base composed of an optical material having a refractive index and including:
   a first surface having a primary outer exposed curve;
   a second surface substantially opposite the first surface and configured to receive a second outer exposed curve;
   a transmission altering layer disposed between the first surface and the second surface and a first thickness between the first surface and a surface of the transmission altering layer, wherein the first thickness is substantially different in a central region of the base than at an edge of the base.

2. The lens of claim 1 wherein the second surface is configured to receive a spherical, spherocylindrical, progressive, aspherical or toroidal curve.

3. The lens of claim 1 wherein the primary outer exposed curve is selected from a group consisting of eight or fewer curves.

4. The lens of claim 1 wherein the transmission altering layer includes a polarizer.

5. The lens of claim 1 wherein the transmission altering layer includes a color.

6. The lens of claim 1 wherein the transmission altering layer includes a photochromic material.

7. The lens of claim 1 wherein the transmission altering layer includes an infra-red absorbing material.

8. The lens of claim 1 wherein the transmission altering layer includes a laser protective material.

9. The lens of claim 1 wherein the transmission altering layer includes a dichroic material.

10. The lens of claim 1 wherein the first surface includes an optical coating.

11. The lens of claim 10 wherein the optical coating is an anti-scratch coating.

12. The lens of claim 10 wherein the optical coating is a photochromic coating.

13. The lens of claim 10 wherein the optical coating is a polarizing coating.

14. The lens of claim 10 wherein the optical coating is an anti-reflective coating.

15. The lens of claim 10 wherein the optical coating is an anti-fog coating.

16. The lens of claim 10 wherein the optical coating is a tintable coating.

17. The lens of claim 1 wherein the optical material is an organic polymer.

18. The lens of claim 1 wherein the optical material is an inorganic material.

19. A series of unfinished lenses comprising a plurality of bases, each base being composed of an optical material having a refractive index and including:
   a first surface configured to receive an anterior outer exposed curve;
   a second surface configured to receive a posterior outer exposed curve;
   a transmission altering layer disposed between the first surface and the second surface;
   and a first thickness between the first surface and a surface of the transmission altering layer when the first surface receives the anterior exposed curve, wherein the first thickness is substantially different in a central region of the base than at an edge of the base and wherein the series includes at least two bases having distinct transmission altering layers.

20. The series of claim 19 wherein the transmission altering layer of one base includes a polarizer.

21. The series of claim 19 wherein the transmission altering layer of one base includes a color.

22. The series of claim 19 wherein the transmission altering layer of one base includes a photochromic material.

23. The series of claim 19 wherein the transmission altering layer of one base includes an infra-red absorbing material.

24. The series of claim 19 wherein the transmission altering layer of one base includes a laser protective material.

25. The series of claim 19 wherein the transmission altering layer of one base includes a melanin-containing material.

26. The series of claim 19 wherein the transmission altering layer of one base includes a dichroic material.

27. The series of claim 19 wherein the first surface includes an optical coating.

28. The series of claim 27 wherein the optical coating is an anti-scratch coating.

29. The series of claim 27 wherein the optical coating is a photochromic coating.

30. The series of claim 27 wherein the optical coating is a polarizing coating.

31. The series of claim 27 wherein the optical coating is an anti-reflective coating.

32. The series of claim 27 wherein the optical coating is an anti-fog coating.

33. The series of claim 27 wherein the optical coating is a tintable coating.

34. The series of claim 19 wherein the optical material is an organic polymer.

35. The series of claim 19 wherein the optical material is an inorganic material.

36. A semi-finished ophthalmic lens comprising a first surface having a primary outer exposed curve and including an optical coating, a second surface substantially opposite the first surface, the second surface capable of receiving a complementary outer exposed curve, a transmission altering layer disposed between the first surface and the second surface, and a first thickness between the first surface and a surface of the transmission altering layer, and a second thickness between the second surface and a surface of the transmission altering layer when the second surface receives the complementary outer exposed curve, wherein the first thickness is substantially different in a central region of the lens than at an edge of the lens, and the second thickness is substantially different in a central region of the lens than at an edge of the lens.

37. A method of manufacturing an eyewear lens comprising:
    forming a primary outer exposed curve on a first surface of an optical material including a transmission altering layer, wherein the optical material has a first thickness between the first surface and a surface of the transmission altering layer, wherein the first thickness is substantially different in a central region of the lens than at an edge of the lens after forming the primary outer exposed curve, and
    forming a complementary outer exposed curve on a second surface of the optical material opposite the first surface, wherein the optical material has a second thickness between the second surface and a surface of the transmission altering layer, wherein the second thickness is substantially different in a central region of the lens than at an edge of the lens after forming the complementary outer exposed curve.

38. The method of claim 37 further comprising coating the primary outer exposed curve with an optical coating on the first surface of the optical material.

39. The method of claim 37 further comprising coating the complementary outer exposed curve with an optical coating on the second surface of the optical material.

40. The method of claim 37 wherein a coating is introduced after the primary outer exposed curve and the complementary outer exposed curve are formed.

41. The method of claim 37 wherein the primary outer exposed curve and the complementary outer exposed curve are selected to form a prescriptive lens.

42. The method of claim 41 wherein a coating is introduced after the primary outer exposed curve and the complementary outer exposed curve are formed.

43. The method of claim 37 wherein the primary outer exposed curve and the complementary outer exposed curve are selected to form a non-prescriptive lens.

44. The method of claim 43 wherein a coating is introduced after the primary outer exposed curve and the complementary outer exposed curve are formed.

45. The method of claim 37 further comprising selecting the primary outer exposed curve from a group eight or fewer curves.

46. The method of claim 38 wherein coating comprises dip coating, slot/extrusion coating, roll coating, spin coating, curtain coating, air-knife coating, hot-melt coating or a combination thereof.

47. The method of claim 37 wherein the coating comprises photochromic, polarizing, anti-reflection, anti-scratch coating or a combination thereof.

48. The method of claim 37 wherein forming the curve includes grinding the surface.

49. The method of claim 38 wherein forming the curve includes grinding the surface.

50. A method of manufacturing a lens comprising:
    selecting a semi-finished lens comprising an optical material having a first surface having a primary outer exposed curve and an optical coating and a second surface substantially opposite the first surface, the second surface configured to receive a complementary outer exposed curve, a transmission altering layer between the first surface and the second surface, a first thickness between the first surface and a surface of the transmission altering layer, and a second thickness between the second surface and a surface of the transmission altering layer, wherein the first thickness is substantially different in a central region of the lens than at an edge of the lens; and
    forming the complementary outer exposed curve on the second surface, wherein the second thickness is substantially different in a central region of the lens than at an edge of the lens.

51. The method of claim 50 wherein forming the complementary outer exposed curve includes grinding the surface.

52. The method of claim 51 further comprising selecting the complementary outer exposed curve from a group of curves that form an ophthalmic prescription in combination with the optical material and the primary outer exposed curve.

53. The method of claim 51 wherein the primary outer exposed curve and the complementary outer exposed curve are selected to form a prescriptive lens.

54. The method of claim 51 wherein the primary outer exposed curve and the complementary outer exposed curve are selected to form a non-prescriptive lens.

55. The lens of claim 1, further comprising a second thickness between the second surface and a surface of the transmission altering layer when the second surface receives the outer exposed curve, wherein the second thickness is substantially different in a central region of the base than at an edge of the base.

56. The series of claim 19, wherein the transmission altering layer has a curvature that is substantially unchanged when the first surface receives the anterior outer exposed curve or when the second surface receives the posterior outer exposed curve.

57. The series of claim 19, further comprising a second thickness between the second surface and a surface of the transmission altering layer when the second surface receives the posterior outer curve, wherein the second thickness is substantially different in a central region of the base than at an edge of the base.

58. The lens of claim 1 wherein the transmission altering layer includes a melanin-containing material.

* * * * *